United States Patent
Kyllingstad et al.

(10) Patent No.: US 9,476,417 B2
(45) Date of Patent: Oct. 25, 2016

(54) METHOD AND SYSTEM FOR DETECTION AND LOCALIZATION OF A FLUID RELATED TO A PISTON MACHINE

(75) Inventors: Åge Kyllingstad, Ålgård (NO); Pål Jacob Nessjøen, Trondheim (NO)

(73) Assignee: NATIONAL OILWELL VARCO NORWAY AS, Sandnes (NO)

(*) Notice: Subject to any disclaimer, the term of this patent is extended or adjusted under 35 U.S.C. 154(b) by 757 days.

(21) Appl. No.: 13/988,909

(22) PCT Filed: Nov. 18, 2011

(86) PCT No.: PCT/NO2011/000322
§ 371 (c)(1),
(2), (4) Date: Jul. 15, 2013

(87) PCT Pub. No.: WO2012/070947
PCT Pub. Date: May 31, 2012

(65) Prior Publication Data
US 2013/0280106 A1   Oct. 24, 2013

(30) Foreign Application Priority Data
Nov. 22, 2010   (NO) .................................. 20101641

(51) Int. Cl.
*F04B 49/00* (2006.01)
*G01M 7/02* (2006.01)
(Continued)

(52) U.S. Cl.
CPC .............. *F04B 49/00* (2013.01); *F04B 51/00* (2013.01); *G01H 1/00* (2013.01); *G01H 1/12* (2013.01); *G01M 3/24* (2013.01); *G01M 7/02* (2013.01); *G06F 17/40* (2013.01); *G06F 19/00* (2013.01)

(58) Field of Classification Search
None
See application file for complete search history.

(56) References Cited

U.S. PATENT DOCUMENTS 2,883,255 A * 4/1959 Anderson ................ B41J 11/36
340/518
5,650,943 A * 7/1997 Powell .................. G01M 3/243
702/51

(Continued)

FOREIGN PATENT DOCUMENTS

| GB | 2190198 A | 11/1987 |
| NO | 20072230 A | 10/2008 |

(Continued)

OTHER PUBLICATIONS

PCT/NO2011/000322 International Search Report dated Feb. 2, 2012 (2 pages).

*Primary Examiner* — Edward Cosimano
(74) *Attorney, Agent, or Firm* — Conley Rose, P.C.

(57) ABSTRACT

A method for detecting and localizing a valve leak in a piston machine having a shaft includes: attaching one or more vibration sensor to a valve block of the piston machine; measuring the vibrations from at least one of the vibration sensors; attaching a sensor to the piston machine where the sensor is designed to produce, directly or indirectly, an angular shaft position signal for the shaft; determining, directly or indirectly, an angular shaft position signal for the shaft; transforming vibration signals from the one or more vibration sensors into one envelope signal representing an instant vibration level; using the angular position signal for constructing window functions that pick the envelope signal in selected angular shaft sectors; using the window functions to find sector based averages of the vibration level; and comparing said averages with a critical ambient vibration level to detect and localize leaks in one or two valves.

20 Claims, 4 Drawing Sheets

(51) Int. Cl.
*G01H 1/12* (2006.01)
*G06F 17/40* (2006.01)
*G06F 19/00* (2011.01)
*F04B 51/00* (2006.01)
*G01H 1/00* (2006.01)
*G01M 3/24* (2006.01)

(56) References Cited

U.S. PATENT DOCUMENTS

| | | | |
|---|---|---|---|
| 5,720,598 A | 2/1998 | de Chizzelle | |
| 5,821,412 A | 10/1998 | Bryant et al. | |
| 7,069,183 B2 * | 6/2006 | Schluecker | F04B 51/00 702/130 |
| 7,401,500 B2 * | 7/2008 | Wago | F04B 51/00 73/168 |
| 8,601,874 B2 * | 12/2013 | Kyllingstad | F04B 51/00 417/437 |
| 2004/0226346 A1 | 11/2004 | Schluecker et al. | |
| 2008/0006088 A1 * | 1/2008 | Wago | F04B 51/00 73/168 |
| 2008/0162058 A1 | 7/2008 | Baklanov et al. | |
| 2010/0189580 A1 * | 7/2010 | Kyllingstad | F04B 51/00 417/437 |

FOREIGN PATENT DOCUMENTS

| | | |
|---|---|---|
| WO | 03/087754 A1 | 10/2003 |
| WO | WO 03/087754 A1 * | 10/2003 |
| WO | 2008133526 A1 | 11/2008 |

\* cited by examiner

METHOD AND SYSTEM FOR DETECTION AND LOCALIZATION OF A FLUID RELATED TO A PISTON MACHINE

CROSS REFERENCE TO RELATED APPLICATIONS

This application is a 35 U.S.C. §371 national stage application of PCT/NO2011/000322 filed Nov. 18, 2011, which claims the benefit of NO application 20101641 filed Nov. 22, 2010, both of which are incorporated herein by reference in their entirety for all purposes.

BACKGROUND

Detection, localization and quantification of leaks related to piston machines (as may hereafter be referred to as pumps, for simplicity) are important for minimizing costs and down time related to valve and piston failures. Today's practice provides no certain way to localize leaks. A leak in one or more valves or pistons will cause a drop in the volumetric efficiency. If a pump is running at a constant speed, this reduction in volumetric efficiency also causes the mean discharge pressure to drop. However, a pressure drop can result also from leaks outside the pump or even reductions in the flow resistance not related to leaks. Such reductions in flow resistance may arise from temperature and viscosity, or they can come from a bypass of one or more flow restrictors. Therefore, a pressure drop cannot be used for localizing the leak.

Skilled operators can sometimes localize valve leaks by listening to the sound of the pump by a simple stethoscope, normally in the form of a screwdriver or a wooden stick held between the valve block and the human ear. There are however some disadvantages related to this method, such as:
  The localization is uncertain, even for a trained and experienced person.
  It is generally not possible to distinguish between a suction valve and a discharge valve.
  The person has to make the diagnosis in hazardous area because he/she must stay very close to the pump while it is running.
  The person will also be exposed to injuriously high sound pressure levels, often exceeding 100 dBA near the pump.
  The diagnosis is time consuming.
  The check will only be carried out at certain intervals.

A leak in a valve or piston manifests itself by several effects that can be picked up by various sensors. The most striking changes due to a growing leak are:
  The discharge pressure starts dropping, provided that the loss in pressure is not compensated by an increase in the total pump rate.
  The discharge pressure from a pump starts to vary cyclically with a period equal to the pump rotation period.
  The suction pressure to a pump also starts to vary cyclically with the same period.
  Low frequency and cyclic vibrations increase, especially on flexible hoses, both the high-pressure hose and the low-pressure hose.
  The high frequency vibration level of the pump near the leak source increases.

Prior art include several methods for leak detection that are utilizing the first four features listed above. According to U.S. Pat. No. 5,720,598, the pressure from at least one pump in combination with the rotational speed of the pump, measured in time, are utilized to determine and analyze the pump harmonics for the presence of a defect and the type of defect. The specific pump unit having the defect is then determined.

WO document 03/087754 describes a method using a combination of active speed variation tests and harmonic analysis to both quantify and localize a leakage.

Experience has shown that the prior art methods above do not work satisfactorily in in situ environments. It is particularly difficult to pinpoint the actual valve leaking.

A leak flow in the reverse direction through a defective valve will generate high frequency vibrations in the valve block. The vibrations may be picked up by an accelerometer placed close to the leak source, for instance on the outside surface of a valve block.

U.S. Pat. No. 5,650,943 describes a method utilizing portable equipment where transducers are applied to appropriate locations in the valve system to obtain sound signals. The signals are fast Fourier transformed into valve signatures. The differential signature method is used to make determinations of valve leaks. The method is designed to evaluate whether a valve is leaking or not. It is not designed to distinguish between leaks in the suction valve and the discharge valve in a valve block. Thus, the method includes comparing obtained signals with stored signals from the actual valve, where the stored signal is obtained from a previously made database. The method will not distinguish between valves in the same valve block.

Norwegian document 20072230 discloses a method that utilizes the fact that a leak in a closed valve of a piston machine will generate high frequency vibrations in the valve block containing the leaky valve. By picking up these vibrations by accelerometers (one per valve block), and processing the vibration data together with a timing signal it is possible by use of the method to detect a leak and localize the leak source.

In situ tests have shown that the method described in Norwegian document 20072230 applies for Hex pumps where the valve blocks are widely separated so that a leak induced vibration transferred from the leaky valve block to another valve block, is small. However, field experience has also shown that said method does not work with pumps, such as quintuplex pumps, having one integrated valve block instead of split valve blocks. The reason is that the damping of the vibration within the block is relatively low. In other words, leak induced vibration can be picked up almost anywhere on the valve block and accelerometer placement will not help to localize the leak like it does in a Hex pump.

In situ measurements also indicate that the method described in Norwegian document 20072230 does not work satisfactorily on triplex pumps, although a triplex pump have separated valve blocks. A possible reason for an observed relatively strong vibration transfer between valve blocks in a triplex pump, may be the suction manifold. The suction manifold is often a relatively large pipe having flanges and it acts as an effective bridge for transfer of vibration between the three suction valve blocks.

The object of the disclosure is to overcome or reduce at least one of the drawbacks of the prior art.

SUMMARY

Embodiments of the present disclosure provide detection and localization of a fluid leak in the valves of a reciprocating piston machine. More specifically embodiments of the present disclosure provide a method for detection and localization of a fluid leak related to a piston machine, where the method includes:

attaching at least one vibration sensor to a valve block of the piston machine;
measuring the vibrations from all vibration sensors; and
attaching a sensor to the piston machine where the sensor is designed to produce, directly or indirectly, an angular shaft position signal for the shaft.

BRIEF DESCRIPTION OF THE DRAWINGS

For a detailed description of exemplary embodiments of the invention, reference will now be made to the accompanying drawings in which.

DETAILED DESCRIPTION

The following discussion is directed to various embodiments of the invention. One skilled in the art will understand that the following description has broad application, and the discussion of any particular embodiment is meant only to be exemplary of that embodiment, and not intended to intimate that the scope of the disclosure, including the claims, is limited to that embodiment.

Embodiments disclosed herein include a method for detecting and localization of a valve leak in a piston machine having a shaft, where the method includes:

attaching at least one vibration sensor to a valve block, of the piston machine;
measuring the vibrations from the at least one vibration sensor;
attaching a sensor to the piston machine where the sensor is designed to produce, directly or indirectly, an angular shaft position signal for the shaft, wherein the method further includes:
determining, directly or indirectly, an angular shaft position signal for the shaft;
transforming the vibration signals from all vibration sensors into one envelope signal reflecting the instant vibration level;
using the angular position signal for constructing window functions that pick up the envelope signal in selected angular shaft sectors;
using the window functions to find sector based averages of the vibration level; and
comparing said averages with a critical ambient vibration level to detect and localize leaks in one or two valves.

The proposed method may be described by two slightly different algorithms. A first algorithm is a simpler one that is well suited for detecting and localizing a single leak. A second algorithm is more advanced and capable of localizing double leaks.

Both algorithms require a shaft angle $\theta$ that may be measured directly from a sensor or calculated for instance as explained below:

A timer signal originates from a sensor that is designed to give a digital timer signal with one pulse per revolution that is used for finding the pump shaft angle at all times. The following sub-algorithm may be used for this timer to angle transformation. The timing signal, which is typically the digital, two levels, signal from a proximity sensor, is useable in this method. The sensor provides only one pulse per revolution but it may be installed at different places, such as the main gear, the crank shaft or one of the piston rods. The following algorithm may be applied to transform the timing signal to the pump shaft angle, $\theta$. This method applies even if the pump speed is not constant but changes slowly during the analysis period.

i. Determine all timer events $\{t_{up,i}\}$ when the timing signal turns from a low value to a high value.
ii. Find the corresponding revolution periods $T_j$ from the difference between successive times.
iii. Find corresponding average pump speeds $\Omega j = 2\pi/T_j$ and center times $t_j = (t_{up,i+1} + t_{up,i})/2$. It should be noted that the number of averages is one less than the number of timer events.
iv. Apply a suitable 1D interpolation/extrapolation method to find the angular pump speed for all time samples: $\Omega = \text{interp1}(tj, \Omega j, t)$.
v. Time integrate said speed to obtain an accumulated pump shaft angle: $\theta_{acc} = \Sigma \Omega \cdot \Delta t$ where $\Sigma$ denotes where accumulated summation and $\Delta t$ denotes sample time interval.
vi. Calculate the difference between said accumulated angle and the real angular shaft position at the first timer event by interpolation, $\theta_{acc,up} = \text{interp1}(t, \theta_{acc}, t_{up,1})$.
vii. Finally, find the pump shaft position as the accumulated pump angle minus said difference: $\theta = \theta_{acc} - \theta_{acc,up} + \theta_{up}$ where $\theta_{up}$ represents the true pump shaft angle when the timer signal goes high.

The angle conversion method above applies equally well if the positive timer signal edge is substituted by the negative timer edge, provided that the pump angle for the negative edge is known. The method employs at least two complete revolutions to be able to provide the angle with a variable speed. Otherwise a constant speed is assumed. If an additional timer signal is used, for instance a proximity sensor sensing all gear teeth of the main gear, a more detailed speed profile can be calculated, without requiring more than two revolutions.

The relatively simple version of the new leak detection algorithm includes the following steps, and it allows one or more acceleration signals to be used.

a) Capture high rate data on acceleration(s), $a_i$, and proximity sensor over a time interval covering at least one pump revolution.
b) Optionally, apply a signal conditioning filter to the raw acceleration signals.
c) Analyze the timing signal to find the shaft angle $\theta$ as a function of time, as described above.
d) Construct an envelope function, for instance $a_{env} = \sqrt{(\Sigma a_i^2)}$, representing the instantaneous vibration level.
e) Calculate the 1$^{st}$ harmonic complex Fourier component of the envelope signal by $c_1 = 2\langle a_{env} \exp(j\theta) \rangle$, where j is the imaginary unit $\sqrt{(-1)}$ and the brackets $\langle \ \rangle$ denote averaging over an integer number of revolutions.
f) Determine the potential leak angle by $\theta_{leak} = \text{angle}(c_1)$, representing the sector center of enhanced vibrations.

g) Construct angle based window function, $w_1$, picking the envelope function in a sector centered on the leak angle $\theta_{leak}$, and another window, $w_0$, picking the envelope function in a sector centered on the complementary angle ($\theta_{leak} \pm \pi$).

h) Find the corresponding vibration levels $s_1 = \langle w_1 a_{env} \rangle / \langle w_1 \rangle$ and $s0 = \langle w_0 a_{env} \rangle / \langle w_0 \rangle$.

i) Set a leak alarm if the highest vibration level exceeds a critical level, for instance $s_{cr} = 2s_0$ and determine that the leaky valve being the one having its closing phase nearest to the observed leak phase $\theta_{leak}$.

The sampling frequency from the accelerometer should be high enough, typically 25 kHz, to include the dominating leak noise vibration frequencies. The conditioning filter in the second step may include firstly a de-spiking or clipping to minimize the effect of valve closing spikes and secondly a band-pass filter for maximize the contrast between leak noise and normal, ambient noise. The envelope function can alternatively include a multiplicative factor or, if only one accelerometer signal is used, be constructed by applying a Hilbert transform: $a_{env} = |\text{Hilbert}(a)|$.

Also the envelope function may optionally, for presentation purposes, be smoothed by a low pass filter having no phase shifts. A possible choice for the windows $w_1$ and $w_0$, which represent the sectors of respective maximum and minimum vibrations, is $w_1 = H(\cos(\theta - \theta_{leak}))$ and $w_0 = H(-\cos(\theta - \theta_{leak}))$, H being the Heaviside step function defined as 1 for positive arguments and 0 otherwise. The suggested windows can alternatively be substituted by smaller sectors ($180° - 2\Delta\theta$) by using the more general formulas $w_1 = H(\cos(\theta - \theta_{leak}) - \sin(\Delta\theta))$ and $w_0 = H(-\cos(\theta - \theta_{leak}) + \sin(\Delta\theta))$, or by continuously varying window functions, such as $w_1 = \sin(\theta - \theta_{leak}) \cdot H(\cos(\theta - \theta_{leak}))$ and $w_0 = \sin(\theta_{leak} - \theta) \cdot H(-\cos(\theta - \theta_{leak}))$. An alternative to using the current low vibration level, $s_0$, as a reference for the critical vibration level, is to use normal ambient vibration levels based on past measurements acquired when all valves were healthy.

Concerning the last step on localizing the leak, it should be realized that each valve has a unique phase representing the center of the leak phase. As an example, if the "firing" order of a quintuplex pump is {1,5,2,4,3} (the numbers representing the linear position order), then the corresponding suction valves have the following center phases $\{\theta_{S1}, \theta_{S2}, \theta_{S3}, \theta_{S4}, \theta_{S5}\} = \{90°, 162°, -126°, -54°, 18°\}$, and the discharge valves have the following phases $\{\theta_{D1}, \theta_{D2}, \theta_{D3}, \theta_{D4}, \theta_{D5}\} = \{-90°, -18°, 54°, 126°, -162°\}$. Here the subscript $_{S1}$, say, refers to the closing phase and the potential leak phase of suction valve 1. The above phase angles are theoretical and based on the assumptions of perfect valves and no fluid compressibility.

In reality inertia and fluid compressibility cause a phase lag. This phase lag can be modeled and corrected for, either by shifting the above valve phases to higher values or by shifting the observed leak phase to a lower value. A suitable model for the lag shift is $\theta_{lag} = \Omega \cdot \tau + \Delta\theta_p$ where $\Omega$ is the pump rotation speed (in rad/s), $\tau$ is the valve closing delay time (typically 0.02 s) and $\Delta\theta_p$ is a pressure lag function. It is a non-linear and complicated function dependent on many factors, such as discharge pressure, fluid compressibility and the so-called clearance volume. The clearance volume is the residual fluid volume between the suction and discharge valves when the piston is fully extended.

The algorithm for leak detection described is capable of detecting and localizing two leaky valves simultaneously, if the leaks have very different strength. The reason is that two leaks will interfere with each other and the resulting envelope function will have a center that may not correspond to any of the leaky valves. However, a skilled operator may probably localize multiple leaks by comparing the vibration signal with the different valve closing phases.

The method may further include:
letting the windows represent 2p non-overlapping sectors where p is the number of pistons in the piston machine;
setting a leak alarm if a group of p or more adjacent sectors have a vibration level exceeding a critical level; and
determining, if the leak alarm is a set, the leaky valves as those valves having closing sectors that match either the first p sectors or the last p sectors of said group.

The method may further include:
determining the center angle of the envelope vibration signal by Fourier analysis;
using said center angle to construct two wide and complementary window functions representing shaft sectors for respective the highest and the lowest vibration level; and
using these window functions and the envelope function to find the average signal level in said sectors;
setting a leak alarm if the highest vibration level exceeds the critical value; and
determining, if the leak alarm is set, the leaky valve as the valve having its closing sector nearest to the window sector of highest vibration level.

The method may further include:
setting a critical vibration level that triggers a leak alarm equal to a multiplicative factor times the minimum value of sector based vibration levels.

The method may further include:
setting a critical vibration level that triggers a leak alarm to a value that is either calculated from an empirical formula as a function of pump speed and discharge pressure, or picked from a look-up table, and where in both cases past measurements of normal ambient vibrations are built-in.

The following alternative algorithm may be used for automatically detecting single and double leaks. This applies for pumps with p pistons and when using one or more accelerometers.

A. Capture a relatively high rate data on accelerations and proximity sensor signal over a time covering at least one pump revolution.

B. Optionally, apply a signal conditioning filter to the raw acceleration signals.

C. Construct an envelope vibration function, based on all accelerometer signals, for instance by $a_{env} = \sqrt{(\Sigma a_i^2)}$, representing the instantaneous vibration level.

D. Analyze the timing signal to find the shaft angle $\theta$ as a function of time, as described above.

E. Construct 2p non-overlapping window functions, $w_k$, that selectively pick the envelope function in corresponding shaft sectors, such that each valve closing phase consists of p adjacent sectors.

F. Calculate the noise level in all 2p shaft sectors by $s_k = \langle w_k \cdot a_{env} \rangle / \langle w_k \rangle$.

G. If p or more adjacent sectors have a noise level exceeding a critical noise level, then set a leak alarm.

H. Determine the potential leaky valves as those valves having opening or closing sectors that match either the first p sectors or the last p sectors of enhanced noise.

A suitable choice for window functions in step E is $w_k = H(\cos(\theta - (2k-1)\pi/(2p) - \theta_{lag}) - \cos(w\pi/p))$ where k is an integer that runs from 1 to 2p, $\theta_{lag}$ is the estimated lag phase and w is a window width factor equal to or less than unity. A reason for using a reduced window width (w<1) in step E is to exclude the vibration spikes occurring when the valves hit the valve seats. These vibrations are not related to leaks and tend to blur the contrast between leaking phases and the non-leaking phases. An alternative to using reduced window width is to use continuously weighted windows representing low weights at the transition sectors, similar to those mentioned as an option in the simple algorithm above. The formula in step F applies for any window option and averages do not require integer revolutions.

By using the minimum sector based vibration level as a reference for the critical level, the method above is able to localize up to two simultaneous leaks of comparable strength, unless both the suction valve and the discharge valve for the same piston are leaking. These valves are perfectly complementary without overlapping closing phases, implying that all sectors could have enhanced vibration levels.

A possible way around this problem is, instead of using the minimum vibration level as a reference, to determine the critical vibration level as a function of pump speed and discharge pressure. The level could either be calculated from an empirical formula or picked from a look-up table. Such a table should incorporate past experience with healthy valves and with different pump speeds and discharge pressures.

The last step in the above algorithm excludes the possibility of triple leaks. This is because when p+2 or more adjacent sectors have enhance vibrations there is a theoretical possibility that also the valves not covering the end sectors could have a leak. However, the probability for a triple leak of comparable size is so low that flagging them as possible leaky valves makes little sense.

The method may further include presenting the actual leaking valve or valves to a human with an indicator panel or user interface with indicators and historical trending.

A preferred way to present the valve conditions to a human is to use a computer interface screen showing a generic view of the pump with its p suction valves and p discharge valves. Leaky valves could for example be highlighted by red indicators and the healthy ones by green indicators.

In cases when the leak alarm is triggered, it will be useful for an operator to view recorded acceleration signals together with the various closing windows on the computer screen. A trained operator could use this information to confirm and check the computer based diagnosis, especially in the case of possible multiple leaks.

A comparative trend plot of the various vibration levels, preferably after normalizing by the critical level, will also help an operator to make a manual evaluation of the valve conditions. Such a plot could reveal a starting leak even before the leak alarm is triggered, and before a second leak has started to develop. Another advantage by storing old time records and processed data is that erratic leak alarms could be ruled out. Such alarms could be triggered by debris of particles temporarily blocking the seal function of an otherwise healthy valve. Erratic alarms could preferably be avoided by advanced logics requiring that a leak must be detected over some specified time interval before the leak alarm is set.

The vibration signals are, when emitted for instance by a loudspeaker, surprisingly well suited for the human ear to identify a leak. When the signals are processed as described above and disturbing noises to a large extent are filtered away, the ear also easily identifies the severity of a leak, in relative terms.

The operator may listen in real time, if there is more than one valve block, to the different valve blocks. This can be done remotely by use of an earphone or a loudspeaker system, and a switch selecting one vibration sensor (valve block) at a time, in the case when multiple accelerometers are used. An operator will even without much training, quickly determine at which valve block the leak is developing. Volume and equalizer filter adjustments can optionally be included to make the leak sound more pronounced.

The method according the various embodiments of the invention discloses a relatively simple and reliable way of detecting and localizing a valve fluid leak in a piston machine, even if the valves are positioned in the same valve block.

Figure 1:
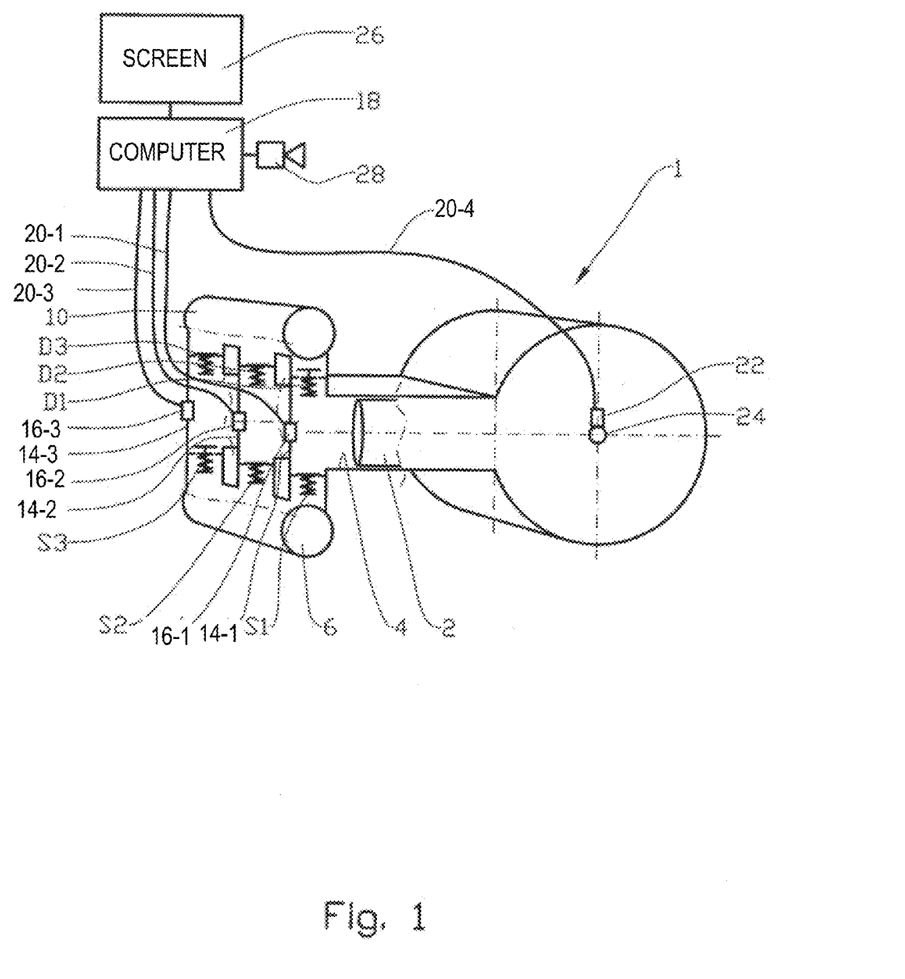
FIG. 1 schematically shows a triplex pump with vibration sensors attached to each valve block of the pump as well as a rotary angle transmitter positioned at the pump shaft.
Figure 2:
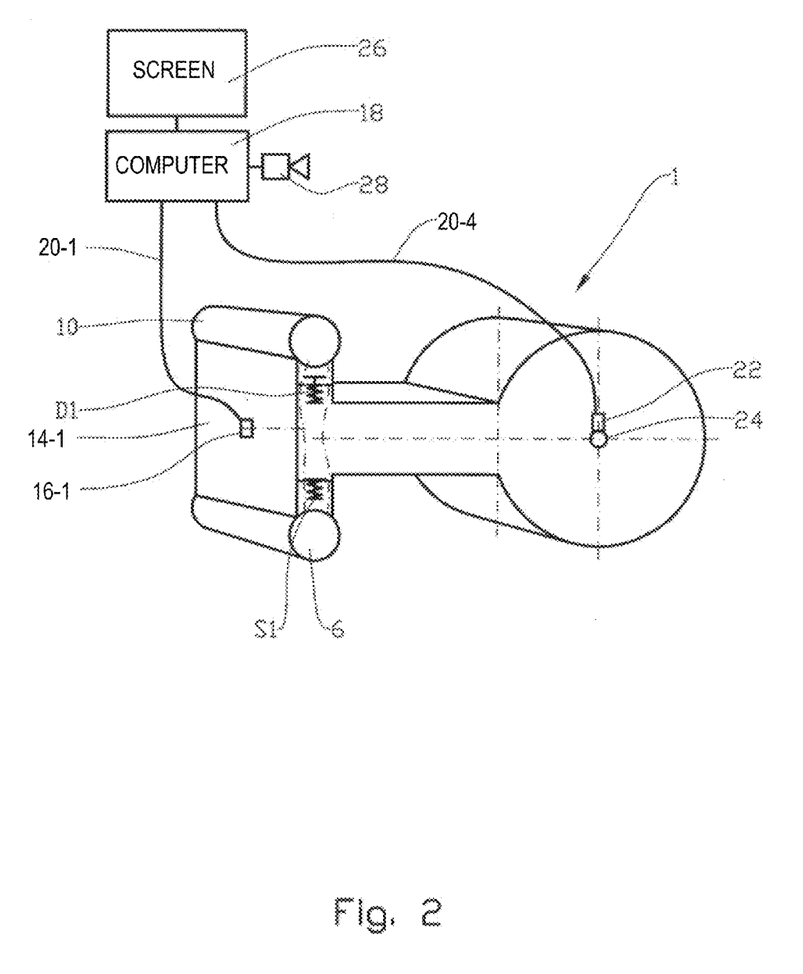
FIG. 2 shows the same as in FIG. 1 of a quintuplex pump where only one vibration sensor is attached to a common valve block.

FIG. 1 schematically shows a pump with vibration sensors attached to each valve block of the pump as well as a rotary angle transmitter positioned at the pump shaft. FIG. 2 shows a quintuplex pump where only one vibration sensor is attached to a common valve block. On the drawings, the reference numeral 1 denotes a pump, for example a so-called triplex pump, provided with three individually acting pistons 2, extending through their respective cylinders 4. Only the first piston 2 and corresponding cylinder 4 is shown. The cylinders 4 communicate with an inlet manifold 6 through their respective suction valves S1, S2 and S3, and an outlet manifold 10 through their respective discharge valves D1, D2 and D3, see FIG. 1.

The first suction valve S1 and the first discharge valve D1 are built into a first valve block 14-1 that communicates with the first cylinder 4. In the same way the second suction valve S2 and the second discharge valve D2 are built into a second valve block 14-2, and the third suction valve S3 and the third discharge valve D3 are built into a third valve block 14-3. On smaller triplex pumps, the valve blocks 14-1, 14-2 and 14-3 may be parts of a common piece of metal.

A first vibration sensor 16-1 that communicates with a computer 18 through a first cable 20-1 is attached to the first valve block 14-1. A second vibration sensor 16-2 that communicates with the computer 18 through a second cable 20-2, is attached to the second valve block 14-2, while a third vibration sensor 16-3 that communicates with the computer 18 through a third cable 20-3, is attached to the third valve block 14-3.

A rotary angle transmitter 22 that communicates with the computer 18 through a fourth cable 20-4, is arranged to give one pulse signal per revolution of the crankshaft 24 of the pump 1.

The computer 18 is equipped with a screen 26 and a loudspeaker 28.

The sensors 16-1, 16-2 and 16-3, the transmitter 22 and the computer 18 are of types that are known per se, and the computer 18 is programmed to carry out the operations disclosed herein.

Vibrations sensed from the valve blocks 14-1, 14-2 and 14-3 are picked up by the vibration sensors 16-1, 16-2 and 16-3 respectively, and transmitted as signals to the computer 18.

The signals are prepared as described in the general part of the description and displayed on the screen 26. Alarms may be given trough the loud speaker 28.

When a leak is developing, a distinctive "hizzing" noise that appears at regular intervals, may be transmitted through the loud speaker 28. The loudness of the hizzing noise increases as the leak develops.

In FIG. 2, the pump 1 may be a quintuplex pump and is shown having only one vibration sensor 16-1 attached to a valve block 14-1. A first suction valve S1 and a first discharge valve D1 of the pump 1 are shown.

Figure 3:
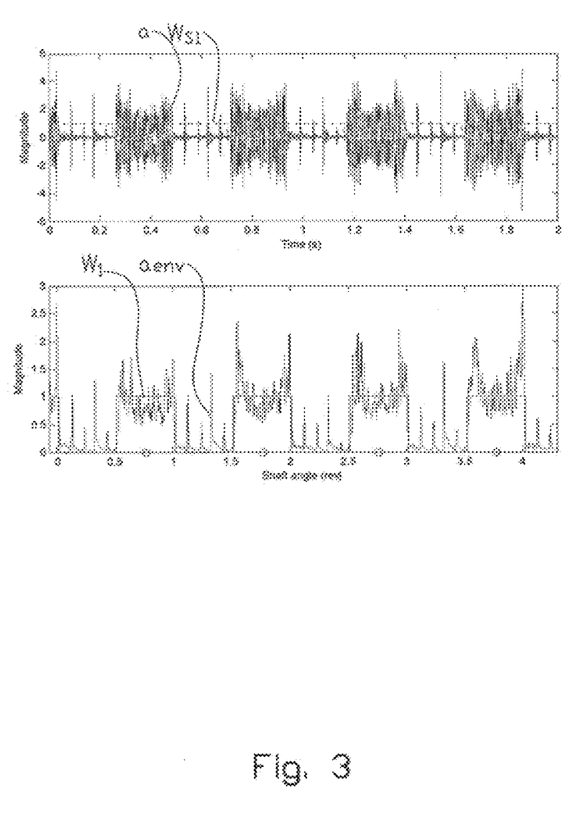
FIG. 3 shows a graph illustrating a raw vibration signal as a function of time, as well as a signal that is processed by use of a method according to embodiments of the invention as a function of shaft angle.
Figure 4:
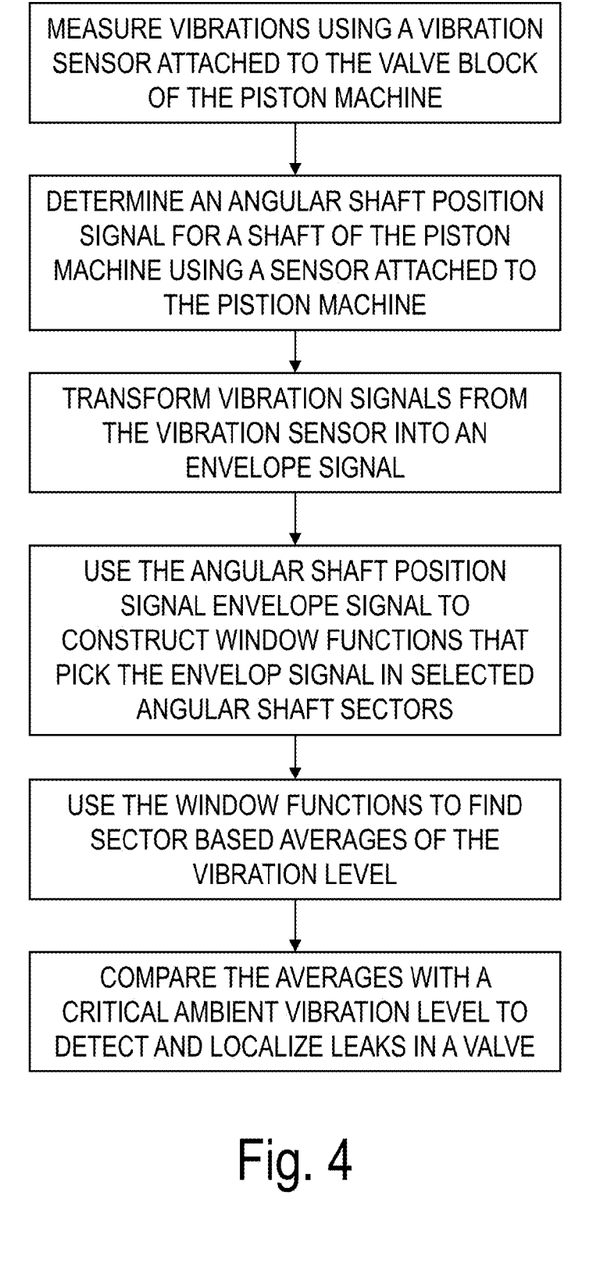
FIG. 4 shows a flow diagram for a method for detecting and localizing a valve leak in a piston machine.

FIG. 3 shows a graph illustrating a raw vibration signal as a function of time, as well as a signal that is processed by use of a method according to embodiments of the invention as a function of shaft angle. In FIG. 3, upper subplot, the raw signal from the sensor 16-1 from a test is shown as a function of time. The upper subplot thus shows the raw accelerometer signal a, scaled in g, during a 2 s period. The window function $w_{S1}$, which represent the theoretical closing interval of the suction valve S1, is included for easy interpretation. This window function is calculated from a timer signal, not shown here, by the method described in the general part of the description. The pump speed varied slightly from about 135 spm (strokes per minute) at start of record to 127 spm at the end and the discharge pressure was about 70 bar. The upper subplot clearly shows that the discharge valve D1 is leaking because of the enhanced vibration level during the closing phase of D1 (complementary phase to the shown S1).

The lower subplot that is plotted against shaft angle in revolutions shows the envelope acceleration $a_{env}$ after smoothing it with a 200 Hz low pass filter. The window function $w_1$ in the lower subplot is the leak window found by Fourier analysis as described by the steps e-g in the algorithm in the general part of the description. The center point, illustrated by a circle in the lower subplot, of this window represents a pump shaft angle of −84°. This value matches almost perfectly with the theoretic value of −90°, taking into account that no lag shift corrections are applied. The vibration level ratio in leaking and non-leaking phases is determined to be 8.6, far exceeding a leak detection threshold typically set to 1.5.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method for detecting and localizing a valve leak in a piston machine having a shaft, comprising:
    attaching one or more vibration sensors to a valve block of the piston machine;
    measuring vibrations from at least one of the vibration sensors;
    attaching a sensor to the piston machine where the sensor is configured to produce, directly or indirectly, an angular shaft position signal for the shaft;
    determining, directly or indirectly, an angular shaft position signal for the shaft;
    transforming vibration signals from the one or more vibration sensors into one envelope signal representing an instant vibration level;
    using the angular position signal for constructing window functions that pick the envelope signal in selected angular shaft sectors;
    using the window functions to find sector based averages of the vibration level, and
    comparing said averages with a critical ambient vibration level to detect and localize leaks in one or two valves.

2. The method of claim 1, further comprising:
    letting the window functions represent 2p non-overlapping sectors, where p is the number of pistons in the piston machine;
    setting a leak alarm if a group of p or more adjacent sectors have a vibration level exceeding the critical level; and
    determining, if the leak alarm is a set, leaky valves as those valves having closing sectors that match either the first p sectors or the last p sectors of said group.

3. The method of claim 1, further comprising:
    determining the center angle of the envelope vibration signal by Fourier analysis;
    using said center angle to construct two wide and complementary window functions representing shaft sectors for highest and lowest vibration level;
    using these window functions and the envelope function to find the average signal level in said sectors; and
    setting a leak alarm if the highest vibration level exceeds the critical value; and
    determining, if the leak alarm is set, a leaky valve as the valve having its closing sector nearest to the window sector of highest vibration level.

4. The method of claim 1, further comprising setting the critical vibration level that triggers a leak alarm equal to a multiplicative factor times a minimum value of sector based vibration levels.

5. The method of claim 1, further comprising setting the critical vibration level that triggers a leak alarm to a value that is either calculated from an empirical formula as a function of pump speed and discharge pressure, or picked from a look-up table, and where in both cases past measurements of normal ambient vibrations are incorporated.

6. The method of claim 1, further comprising presenting an actual leaking valve or valves for a human.

7. The method of claim 1, further comprising:
    attaching a sensor to the piston machine where the sensor is designed to produce a digital timer signal with one pulse per revolution;
    determining all timer events when the timing signal turns from a low value to a high value or from high value to low value;
    finding corresponding revolution periods from a difference between successive timer events;
    finding corresponding average pump speeds and center times;
    applying a suitable 1D interpolation/extrapolation method to find angular pump speed for all time samples;
    time integrating said speed to obtain an accumulated pump shaft angle;
    calculating a difference between said accumulated angle and real angular shaft position at a first timer event; and
    finding pump shaft position as the accumulated pump angle minus said difference.

8. A system, comprising:
    a piston machine, comprising:
        a plurality of cylinders, a piston disposed in each of the cylinders;
        a suction valve and a discharge valve coupled to each of the cylinders via a valve block;
        a vibration sensor attached to the valve block;
        a crankshaft coupled to the pistons; and
        a rotary angle transmitter configured to provide one pulse per revolution of the crankshaft; and
    a computer communicatively coupled to the vibration sensor and the rotary angle transmitter, the computer configured to:
        generate an angular position signal for the crankshaft;
        transform a vibration signal from the vibration sensor into an envelope signal representing an instant vibration level;

construct, using the angular position signal, window functions that pick the envelope signal in selected angular shaft sectors;

find sector based averages of the vibration level using the window functions, and compare the averages with a predetermined ambient vibration level to detect and localize leaks in up to two of the valves.

9. The system of claim 8, wherein the computer is configured to:

generate the window functions to represent 2p non-overlapping sectors, where p is a total number of pistons in the piston machine;

set a leak alarm based on a group of p or more adjacent sectors having a vibration level that exceeds a predetermined level; and determine leaky valves to be those valves having closing sectors that match either a first p sectors or a last p sectors of said group.

10. The system of claim 8, wherein the computer is configured to:

determine a center angle of the envelope vibration signal by Fourier analysis;

use the center angle to construct two complementary window functions representing shaft sectors for highest and lowest values of the vibration level;

use the complementary window functions and the envelope signal to find the average signal level in the sectors;

set a leak alarm based on the highest vibration level exceeding a predetermined value; and determine a leaky valve to be the valve having its closing sector nearest to the window sector of highest vibration level.

11. The system of claim 8, wherein the computer is configured to set a predetermined vibration level that triggers a leak alarm equal to a multiplicative factor times a minimum value of sector based vibration levels.

12. The system of claim 8, wherein the computer is configured to set a predetermined vibration level that triggers a leak alarm based on past measurements of normal ambient vibrations wherein the predetermined vibration level is either calculated from an empirical formula as a function of pump speed and discharge pressure, or selected from a look-up table.

13. The system of claim 8, wherein the computer is configured to provide a display identifying a leaking valve.

14. The system of claim 8, wherein the computer is configured to:

determine all timer events based on one edge of the pulse;

determine revolution period of the crankshaft based on a time difference between successive instances of the pulse;

determine corresponding average pump speeds and center times;

apply at least one of interpolation and extrapolation to find the angular pump speed for all time samples;

time integrate pump speed to obtain an accumulated pump shaft angle;

calculate a difference between the accumulated angle and actual angular shaft position at a given pulse; and find the pump shaft position as the accumulated pump angle minus said difference.

15. A non-transitory computer-readable medium encoded with instructions that when executed cause a computer to:

receive one pulse per revolution of a crankshaft from a rotary angle transmitter attached to a piston machine;

receive vibration signals from a vibration sensor attached to valve block of the piston machine;

generate an angular position signal for the crankshaft based on the one pulse per revolution;

transform the vibration signals into an envelope signal representing an instant vibration level;

construct, using the angular position signal, window functions that pick the envelope signal in selected angular shaft sectors;

find sector based averages of the vibration level using the window functions, and compare the averages with a predetermined ambient vibration level to detect and localize leaks in up to two valves of the piston machine.

16. The computer-readable medium of claim 15 encoded with instructions that when executed cause a computer to:

generate the window functions to represent 2p non-overlapping sectors, where p is a number of pistons in the piston machine;

set a leak alarm based on a group of p or more adjacent sectors having a vibration level that exceeds the predetermined level; and determine leaky valves to be those valves having closing sectors that match either the first p sectors or the last p sectors of said group.

17. The computer-readable medium of claim 15 encoded with instructions that when executed cause a computer to:

determine a center angle of the envelope vibration signal by Fourier analysis;

use the center angle to construct two complementary window functions representing shaft sectors for highest and lowest values of the vibration level;

use the complementary window functions and the envelope signal to find average signal level in the sectors;

set a leak alarm based on the highest vibration level exceeding a predetermined value; and determine a leaky valve to be the valve having its closing sector nearest to the window sector of highest vibration level.

18. The computer-readable medium of claim 15 encoded with instructions that when executed cause a computer to set the predetermined vibration level that triggers a leak alarm equal to a multiplicative factor times a minimum value of sector based vibration levels.

19. The computer-readable medium of claim 15 encoded with instructions that when executed cause a computer to set the predetermined vibration level that triggers a leak alarm based on past measurements of normal ambient vibrations wherein the predetermined vibration level is either calculated from an empirical formula as a function of pump speed and discharge pressure, or selected from a look-up table.

20. The computer-readable medium of claim 15 encoded with instructions that when executed cause a computer to provide a display identifying a leaking valve.

* * * * *